United States Patent [19]

Arai

[11] Patent Number: 5,550,612
[45] Date of Patent: Aug. 27, 1996

[54] FOCAL POINT CORRECTION APPARATUS

[75] Inventor: Akihiro Arai, Tokyo, Japan

[73] Assignee: Asahi Kogaku Kogyo Kabushiki Kaisha, Tokyo, Japan

[21] Appl. No.: 338,124

[22] Filed: Nov. 9, 1994

[30] Foreign Application Priority Data

Nov. 9, 1993 [JP] Japan ................... 5-064735 U

[51] Int. Cl.$^6$ ................................. G03B 13/36
[52] U.S. Cl. ............................................ 354/400
[58] Field of Search ...................... 354/400; 355/55; 353/101; 352/140

[56] References Cited

U.S. PATENT DOCUMENTS

| | | | |
|---|---|---|---|
| 3,639,048 | 2/1972 | Heaney et al. | 353/101 |
| 4,714,331 | 12/1987 | Oda et al. | 353/101 X |
| 4,987,436 | 1/1991 | Misawa | 354/203 |

*Primary Examiner*—W. B. Perkey
*Attorney, Agent, or Firm*—Greenblum & Bernstein P.L.C.

[57] ABSTRACT

A camera equipped with a focal point correction apparatus has a camera body including a film loading portion, a position detecting mechanism, an optical system including a picture taking lens, a shutter, a lens driving mechanism, a pressure plate, a light measuring device, a distance measuring device, a memory, a shutter driving mechanism, a release switch, and a control unit. The position detecting mechanism has a light projecting unit and a light receiving unit and is used to measure the position of the light-sensitive surface of the film in the direction of the optical axis. The focal point correction apparatus includes the position detecting mechanism, the optical system, the memory and the control unit. When a photograph is taken, focal point correction is carried out by determining a correction value for correcting the extension setting of the picture taking lens based on measurements of the position of the film carried out by the position detecting mechanism.

15 Claims, 4 Drawing Sheets

FOCAL POINT CORRECTION APPARATUS

BACKGROUND OF THE INVENTION

1. Field of the Invention

The present invention relates to a focal point correction apparatus, and in particular relates to a focal point correction apparatus for use in cameras for example.

2. Description of the Prior Art

Conventionally, in automatic focusing mechanisms for cameras, focal point detecting devices have been constructed so as to detect a focusing condition of an optical image formed on a point that is optically equivalent to a predetermined fixed position to which a light sensitive surface of a film is to be disposed (referred to below as the "base focal position") and that is physically different from the light sensitive surface of the film, because it is not possible to directly detect the optical image formed on the film surface. On the other hand, the film is positioned within a camera by being pressed from the backside thereof with a pressure plate, for example such that the light sensitive surface of the film is accurately positioned at the base focal position.

However, it is difficult to properly position the light sensitive surface of the film at the base focal position due to the tendency of the film to curl along its lengthwise direction as a result of the film being wound and due to a curvature of the film across its breadth which is caused by changes in the surrounding environment such as changes in humidity, temperature, etc. Therefore, experience has shown that the pressure plate should be placed at a position where the image looks best on average.

For this reason, the condition of the film will have a direct effect on the extent of improper focusing, and in particular, this effect will be much stronger for the central portion of a film used in cameras using a relatively large size film. In other words, the extent of improper focusing is greater for such cameras using the relatively large size films.

For example, among the Brownie size films, there are the "120 film" which has paper backing and the "220 film" which has no paper backing, with these two films having different thicknesses relative to each other. As a result, cameras which are adapted to use these two films are provided with a switching mechanism making it possible to select two positions for the pressure plate, namely, one position suitable for the "120 film" and the other position suitable for the "220 film", so that both films may be properly positioned at the base focal position. Consequently, when photographing with this type of camera and a Brownie size film, it is necessary for the photographer to operate the switching mechanism of the camera in order to select the proper position for the particular type of film being used.

However, the above construction creates several problems for the photographer. Namely, there is the inconvenience of having to reset or check the switching mechanism each time the film is changed, and in the case where the photographer forgets to reset the switching mechanism when changing to a different type of film, improper focusing will result. Furthermore, even in the case where the switching mechanism is set at the proper setting for the thickness of the film being used, environmental factors, for example may give rise to curling or curvature of the film, and in this case, such problems cannot be dealt with in the same way as was mentioned previously above.

SUMMARY OF THE INVENTION

It is an object of the present invention to provide a focal point correction apparatus for correcting the focus of an objective lens according to the position of the light sensitive surface of a film.

In order to achieve this object, the present invention comprises an optical system including an object lens for forming an image on a light-sensitive material and a position detecting mechanism which detects the position of the light-sensitive material in the direction of the optical axis of the optical system. The data from the position detecting mechanism is used to determine a correction value for correcting the focal point of the taking lens. In particular, the data from the position detecting mechanism is used to determine a correction value for correcting the extension setting of the taking lens.

In accordance with the focal point correction apparatus described above, it is possible to obtain proper focusing conditions every time a photograph is taken, despite the extent of displacement of the film due to curling and curvature of the film or differences in thickness of the film, by measuring the displacement of the film with the position detecting mechanism and then using the measured value to determine a correction value for correcting the extension setting of the taking lens.

In this regard, the focal point correction apparatus according to the present invention is particularly suitable for cameras which use relatively large size films because in such cameras there is more of a tendency for improper focusing to occur due to the size of the film. However, the focal point correction apparatus according to the present invention assures that proper focusing will be carried out even in cameras that use relatively small size film.

Preferably, for detecting the position of the light-sensitive material, the position detecting mechanism employs a light projecting unit that projects a beam of light at a point on the light-sensitive material and a light receiving unit which measures the position of the reflected beam. In more detail, the position detecting mechanism includes a light projection unit which emits a beam of light towards the surface of the light-sensitive material, and a light receiving unit that receives the beam of light reflected from the surface of the light-sensitive material. The light receiving unit has a light receiving element to which the beam of the reflected light is received at different positions thereof corresponding to different positions of the light-sensitive material at which the emitted beam is struck.

More preferably, the present invention further includes a memory in which a table is stored that lists focal point correction values corresponding to the position of the light-sensitive material in the direction of the optical axis and a control unit that corrects the focal point of the taking lens by correcting the extension setting of the taking lens using the data obtained from the position detecting mechanism and the table stored in the memory.

Alternatively, the focal point correction apparatus according to the present invention may be constituted from an optical system having a taking lens and an optical axis For focusing images onto a surface of a light-sensitive material; a mechanism for measuring the position of the surface of the light-sensitive material in the direction of the optical axis to output data corresponding to the measured position; a mechanism for calculating a correction value based on the output data from the position measuring mechanism; and a mechanism for correcting the relative position between the image formed by the taking lens and the surface of the light-sensitive material in the direction of the optical axis in response to the correction value.

Further, the focal point correction apparatus according to the present invention may be constituted from an optical system having a taking lens and an optical axis for focusing images onto a surface of a light-sensitive material; a predetermined base focal position on which light From an object to be photographed is adapted to be focused; a mechanism for measuring the position of the surface of the light-sensitive material in the direction of the optical axis relative to the predetermined base focal position; mechanism for calculating a correction value on the basis of the difference between the predetermined base focal position and the measured position; and a mechanism for correcting the relative position between the image formed by the taking lens and the surface of the light-sensitive material in the direction of the optical axis in response to the correction value.

Other objects, structures and advantages of the present invention will be more apparent from the following description of the preferred embodiments of the present invention, taken in conjunction with the accompanying drawings.

DETAILED DESCRIPTION OF THE PREFERRED EMBODIMENTS

Described below is a detailed description of the preferred embodiments of the focal point correction apparatus of the present invention taken in conjunction with the appended drawings. It is to be noted that the description of the focal point correction apparatus of the present invention presented below is for a preferred case of a camera having an automatic focusing (autofocus) mechanism.

Figure 1:
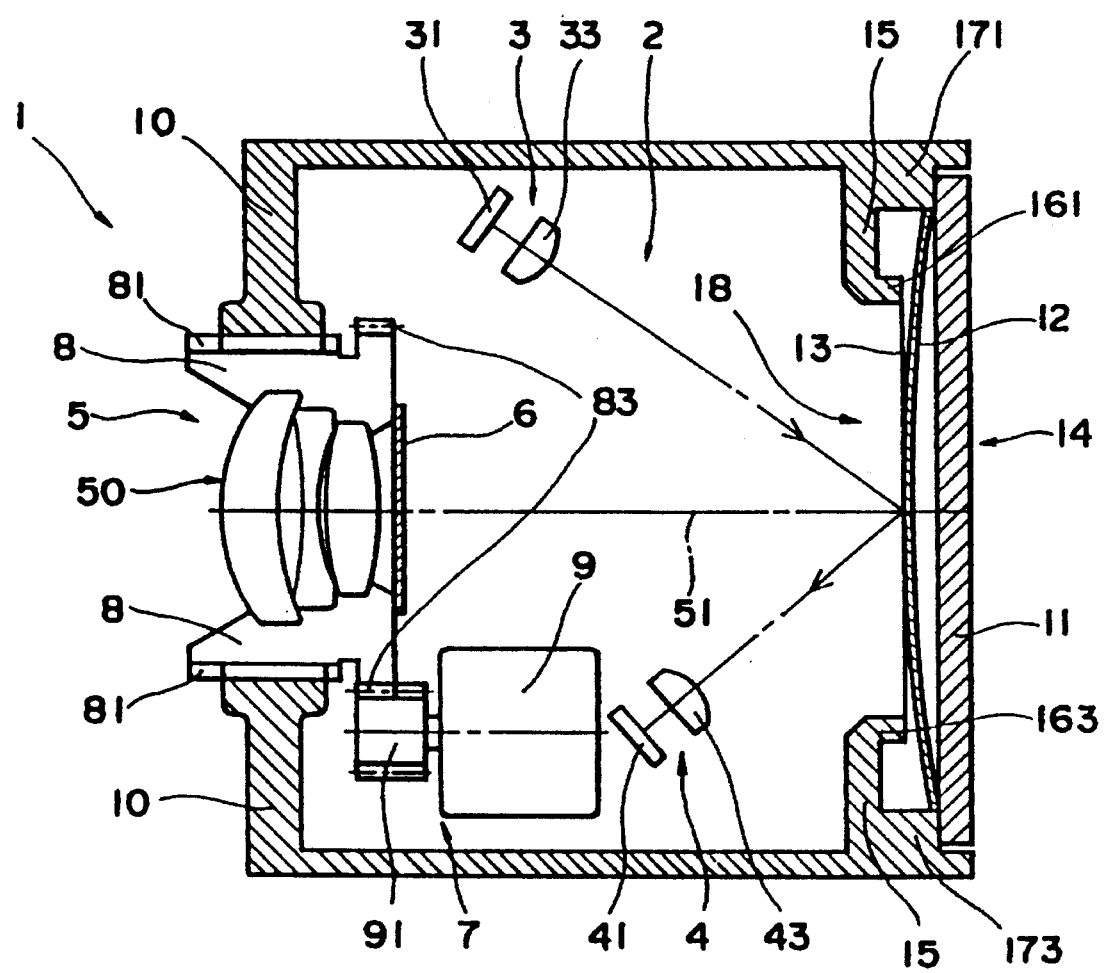
FIG. 1 is a cross-sectional view of an example of a construction of a camera having an automatic focusing mechanism and a focal point correction apparatus according to the present invention.

FIG. 1 shows a cross-sectional view of an example of a construction of a camera having an automatic focusing mechanism and a focal point correction apparatus according to the present invention. As shown in the drawing, the camera 1 includes a camera body 10, a position detecting mechanism 2, a photographic optical system 5 including an objective lens 50, a shutter 6, a lens driving mechanism 7, a pressure plate 11, a light measuring mechanism 22, a distance measuring mechanism 23, a memory 24, a shutter driving mechanism 25, a release switch 26, and a control mechanism 21 (See FIG. 3). The focal point correcting apparatus is comprised of the position detecting mechanism 2, the photographic optical system 5, the memory 24 and the control mechanism 21.

Formed at the back of the camera body 10 is a film loading section 14 for loading film 12. Provided in the film loading section 14 are flange members 15 which define a rectangular aperture 18 (see FIG. 2). Formed on the flange members 15 so as to protrude towards the pressure plate 11 are a pair of abutting portions 161 and 163 against which the film 12 is to be abutted. These abutting portions 161 and 163 extend along the longitudinal direction of the film 12. In this embodiment, the surface formed by the backside end surfaces of the abutting portions 161 and 163 forms a base focal surface 13.

Further formed on the flange members 15 in the film loading section 14 at the top and bottom walls of the camera body 10 (the top and bottom walls shown in the middle of FIG. 1) so as to protrude towards the back of the camera body further than the abutting portions 161 and 163 are another pair of abutting portions 171 and 173 against which the pressure plate abuts. These abutting portions 171 and 173 extend along the longitudinal direction of the film 12.

As for the pressure plate 11, it is formed into a plate-shaped member for pushing the film 12 loaded in the film loading section 14 from the back surface thereof towards the objective lens 50. For biasing the pressure plate 11 towards the objective lens 50, a biasing mechanism (not shown in the drawings) is provided at the backside surface of the pressure plate 11.

In the above described film loading section 14, the film 12 is held by the pressure plate 11 and the abutting portions 161 and 163 so as to position the light-sensitive surface of the film 12 at the base focal surface 13 or in the vicinity thereof.

Hereinbelow, the term "surface displacement" will refer to a situation in which the light-sensitive surface of the film 12 loaded in the film loading section 14 is displaced from the base focal surface 13, and the term "surface displacement extent" will refer to the amount of displacement of the light-sensitive surface of the film 12 from the base focal surface 13 along the direction of the optical axis 51.

The position detecting mechanism 2 of the camera 1 detects the position of the light-sensitive surface (the emulsion surface) of the film 12 along the optical axis 51 of the photographic optical system 5, namely the surface displacement extent. The position detecting mechanism 2 is includes of a light projecting unit 3, which includes a light source 31 and a light projecting lens 33, and a light receiving unit 4, which includes a light receiving element 41 and a light gathering lens 43. In this case, it is preferred that the light source 31 emits a wavelength of light that does not have any substantial effect on light sensitive material. For example, an infrared light emitting element, for example is used. Also, it is preferred that the light receiving element 41 utilize, for example, a line sensor, a position sensitive device (PSD), etc.

With regard to the light projecting unit 3 and the light receiving unit 4 of the position detecting mechanism 2, they are positioned so as to allow light emitted from the light projecting unit 3 to strike the base focal position at the central portion thereof and be reflected to the light receiving unit 4. Therefore, if the light emitted from the light projecting unit 3 is reflected onto the surface of the film at a position different from the base focal position, the reflected light is received by the receiving unit 4 at a displaced position therein, in response to the displacement extent and the changed direction of the reflected light in comparison with the case that the light is properly reflected at the base focal position. Furthermore, the light projecting unit 3 and the light receiving unit 4 are arranged so that the point of measurement at the time of detecting the position of the light-sensitive surface of the film 12 optically substantially matches with the point of measurement at the time of measuring the distance between the camera 1 and the object being photographed with the below-described distance measuring mechanism 23 on the photographic image plane.

As for the taking lens 50, it is one component of the photographic optical system 5 for forming images of the object being photographed onto the light-sensitive surface of the film 12. The taking lens 50 is provided inside a lens barrel 8. The lens barrel 8 is a circular tube shaped member provided in the camera body 10 so as to be movable along the direction of the optical axis 51 of the photographic optical system 5. At a rear portion of the outer circumferential surface of the lens barrel 8 there is formed a gear 83, and at a front portion of the outer circumferential surface of the lens barrel 8 (at the side opposite to that of the pressure plate 11) there is formed a screw portion 81 that screws into a threaded portion (not shown in the drawings) formed in the inside surface of an opening at the front of the camera body 10.

The lens driving mechanism 7, which includes a motor 9 serves to drive the lens barrel 8. A gear wheel 91 which meshes with a gear 83 of the lens barrel 8 is attached to the rotation axle of the motor 9. In this case, the gear wheel 91 is made wide enough to cover the range of movement of the gear 83 which is caused by the movement of the lens barrel 8.

With regard to the shutter 6, it is a shutter (lens shutter) which restricts a diaphragm and is positioned behind the taking lens 50 inside the lens barrel 8. Furthermore, the shutter has a plurality of shutter plates and a shutter driving mechanism 25 which rotates the shutter plates in order to open and close an aperture.

Figure 3:
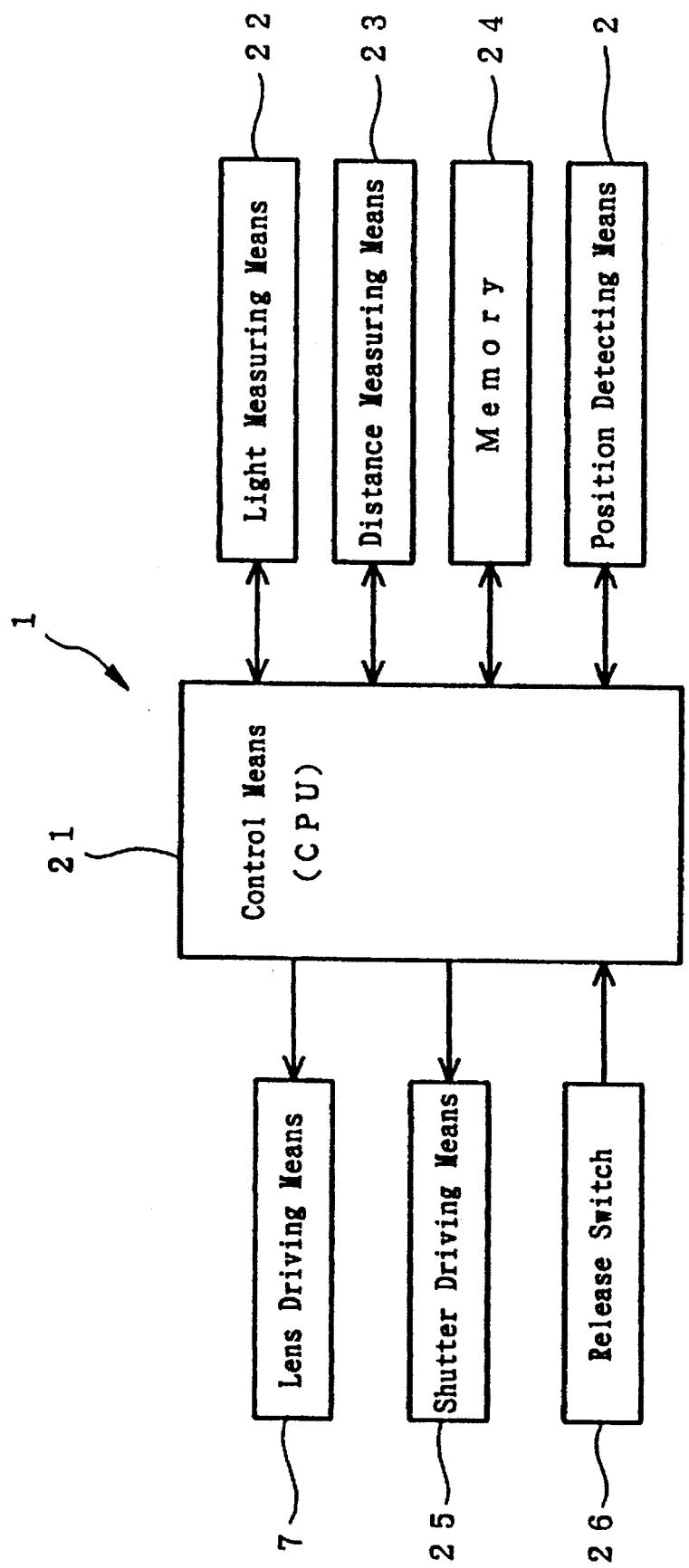
FIG. 3 illustrates a block diagram for the camera 1 shown in FIG. 1.

FIG. 3 is a block diagram for the camera 1 shown in FIG. 1. And as is shown in FIG. 3, the control mechanism 21 includes, for example, a microcomputer for carrying out control of the focal point correction apparatus. Further, the control mechanism also carries out control of other operations such as sequential program operations, autofocusing operations, and exposure operations of the camera etc.

With regard to the light measuring mechanism 22, it measures the brightness of the object to be photographed and inputs such information to the control mechanism 21.

The distance measuring mechanism 23 is, for example, an active type or a passive type measuring mechanism and measures the distance from the camera 1 to the object to be photographed or the amount of defocusing relative to the base focal surface 13 and then inputs such information to the control mechanism 21.

As for the release switch 26, it is a two-step type switch in which switching on the first step operates the light measuring mechanism 22 and the distance measuring mechanism 23 and switching on the second step operates the shutter driving mechanism 25 to operate the shutter to allow a photograph to be taken. Thus, when the shutter 6 is operated, the control mechanism 22 controls the speed of shutter 6 and the amount of restriction of the shutter 6 when open in order to obtain the appropriate exposure as determined by the calculating section of the control mechanism 21 based upon the information received from the light measuring mechanism 22.

In this connection, the memory 24 could employ, for example, a nonvolathe memory in which a prescribed table or formulas (coefficients of the formulas) used in carrying out focal point correction is stored.

Next, an explanation will be given below for the operation of the camera 1 and the operation of the focal point correction apparatus (i.e, the focal point correction method).

First, a description of the outline of the focal point correction method will be given. In this connection, FIG. 2 is a cross-sectional view showing a situation in which the light-sensitive surface of the film 12 is displaced from the base focal surface 13 in the camera 1 shown in FIG. 1.

Figure 2:
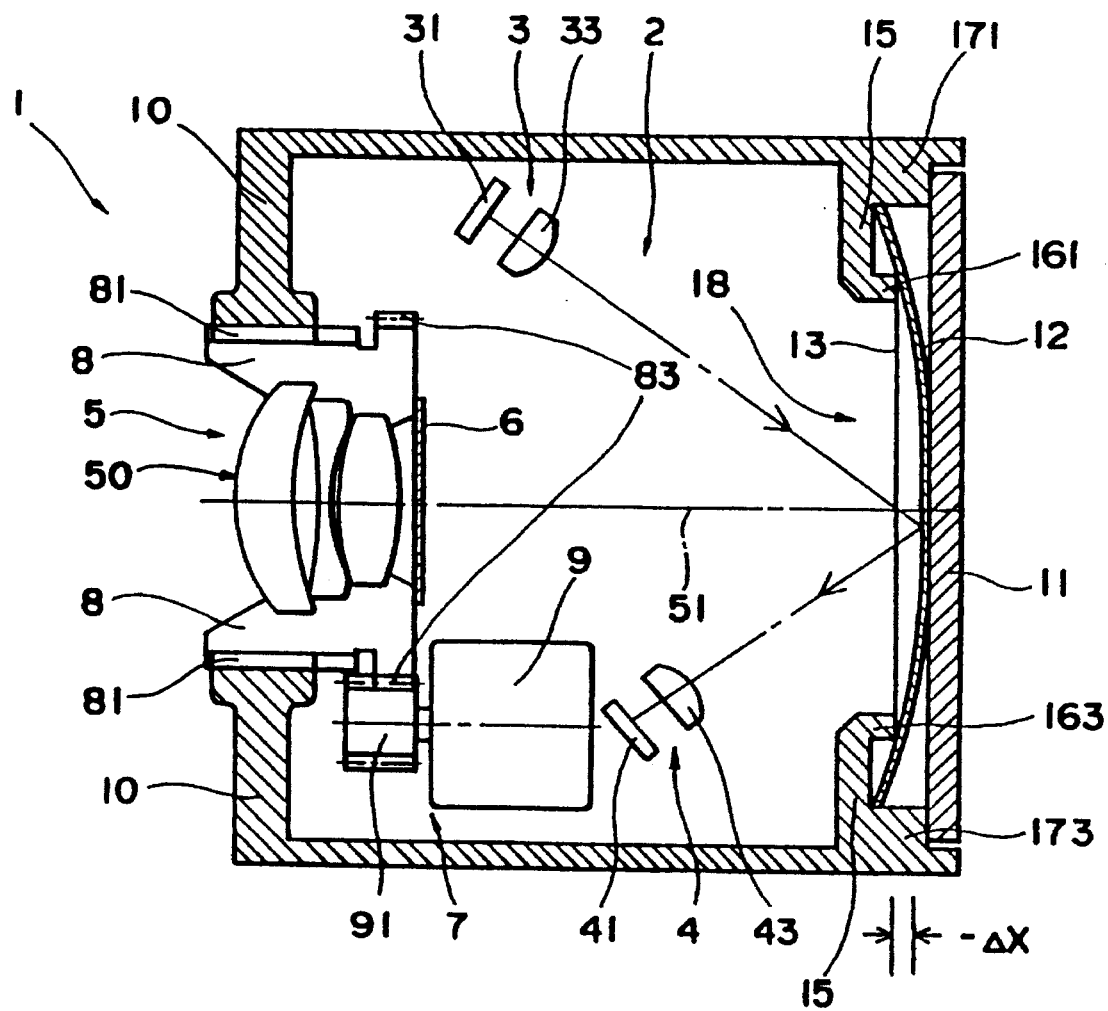
FIG. 2 is a cross-sectional view showing the situation in which a light-sensitive surface of the film 12 is displaced from the base focal surface 13 in the camera 1 shown in FIG. 1.

As shown in FIG. 2, the focal point correction apparatus of the present embodiment measures the amount of displacement of the central portion of the light-sensitive surface of the film 12 (i.e., the amount of displacement $\Delta x$ and the direction of displacement) each time a photograph is being taken and determines an appropriate correction value to compensate for such displacement. Then, by subtracting the correction value from the value which represents the initial extension setting of the taking lens 50, a value for the final extension setting of the taking lens 50 can be obtained, thereby correcting the position of the taking lens 50 on the basis of the obtained value.

Now, as shown in FIG. 3, when a photographer switches on the first step of the release switch 26, the light measuring mechanism 22 and the distance measuring mechanism 23 are operated. At this time, the light measuring mechanism measures the brightness of the object to be photographed and inputs such information to the control mechanism 21, and the distance measuring mechanism 23 measures the distance from the camera 1 to the object to be photographed and inputs this information to the control mechanism 21.

Next, the control mechanism 21 determines the appropriate level of exposure based on results obtained from carrying out prescribed calculation steps with the information inputted from the light measuring mechanism 22. In addition to this, the control mechanism 21 determines an extension setting (driving value) for the taking lens 50, namely, an extension setting for the taking lens 50 before correction is carried out, in order to focus light on the base focal surface 13 based on results obtained from carrying out prescribed program steps with the information inputted from the distance measuring mechanism 23.

Furthermore, when the first step of the release switch 26 is switched on, the position detecting mechanism 2 of the focal point correction apparatus is operated. Namely, as shown in FIG. 2, infrared light emitted from the light source 31 of the light projecting unit 3 is reflected off the central portion of the film 12 towards the light receiving element 41 of the light receiving unit 4 according to a position of the film 12 along the optical axis. In this example, the displacement of the central portion of the film 12 (i.e., the amount of displacement $\Delta x$ and the direction of displacement) causes the light reflected from the film 12 to strike the light receiving element 41 at a displaced position (light receiving position) thereof, and such information is inputted to the control mechanism 21.

Now, as for the direction of displacement, it is indicated by the symbols plus or minus (+ or −), and as shown in FIG. 2, when the light-sensitive surface of the film 12 is displaced to a position behind the base focal surface 13, the amount of displacement has a negative value, namely "$-\Delta x$". And in the case when the light-sensitive surface of the film 12 is displaced to a position in front of the base focal surface 13 (not shown in the drawings), the amount of displacement has a positive value, namely "$\Delta x$".

In this connection, stored in the memory 24 is a table that lists combinations of the appropriate correction value for adjusting the extension setting of the taking lens 50 and each light receiving position on the light receiving element 41 which corresponds to a displacement value of the central portion of the film 12. Next, from the information on the light receiving position inputted from the light receiving element 41 and the table stored in the memory 24, the control mechanism is able to determine the displacement value of the central portion of the film 12, which enables it to obtain a correction value for adjusting the extension setting of the taking lens 50. Then, by subtracting the obtained correction value from the initial value of the extension setting of the taking lens 50, a final extension setting for the taking lens 50, namely, an extension setting that will enable the taking lens to focus light on the central portion of the film 12, is computed.

Now, when the photographer switches on the second step of the release switch 26, the motor 9 of the lens driving mechanism 7 rotates to move the taking lens 50 from its initial extension setting to the corrected extension setting. At this time, as shown in FIG. 2, the rotation of the motor 9 causes the gear wheel 91 to rotate, which causes the lens barrel 8 to rotate with a reduced speed, and then through the turning of the screw 81 of the lens barrel 8 within the threads of the camera body 10, the lens barrel 8 is moved in the direction of the optical axis 51 by a prescribed amount. In this way, it is possible to obtain a correct focusing of light on the light-sensitive surface of the film 12, and such focusing operations are preferably carried out using an autofocusing mechanism.

With regard to the focusing described above, it is not limited to the case of forming an image of the object being photographed onto the light-sensitive surface of the film, but also includes the situation where an image of the object being photographed is formed in the vicinity of the light-sensitive surface of the film. Namely, such focusing includes the situation where the position of the light-sensitive surface of the film lies somewhere between the focusing point for the object being photographed and the depth of field.

Upon obtaining the focusing situation described above, the shutter driving mechanism 25 is activated to operate the shutter 6 to take a picture. At this time, as was previously mentioned, the shutter 6 is operated so as to achieve a proper exposure level determined according to the level of brightness previously measured. Namely, the adjustment of the exposure level is carried out, for example, by changing the shutter speed and the restriction value of the shutter 6.

In this way, the focal point correction apparatus of the present embodiment makes it possible to obtain proper focusing conditions between the taking lens and the loaded film at all times. This is accomplished by correcting the extension setting of the taking lens 50 each time a photograph is taken by measuring the amount of displacement of the central portion of the film 12 with the position detecting mechanism 2 and then using this value as the correction value for the taking lens 50. Moreover, as the amount of displacement is measured and the position of the taking lens is corrected each time a photograph is taken, it is possible to achieve a proper correction despite the thickness and the extent of curling and curvature of each film.

Furthermore, as the point of measurement at the time of detecting the position of the light-sensitive surface of the film 12 with the position detecting mechanism 2 overlaps or is in close proximity with the point of measurement at the time of measuring the distance between the camera 1 and the object being photographed with the distance measuring mechanism 23 on a photographic image plane, an extremely accurate correction can be carried out by making the focal point lie at the distance measuring point or in the vicinity thereof.

Moreover, when taking photographs with films having different thicknesses, for example, when using Brownie size type films such as "120 film" having a paper backing or "220 film" having no paper backing, no switching operations are required for such films. Thus, it is possible to omit the switching mechanism, which, in addition to simplifying the basic structure of the camera, simplifies the camera operations for the photographer and eliminates the possibility of improper focusing caused up to now by photographers either forgetting to reset the switching mechanism or putting the switching mechanism at the wrong setting when changing to a different type of film.

Also, as the extension setting value of the object lens 50 is corrected based on direct measurements of the amount of displacement of the film 12 using the position detecting mechanism 2, it is possible to achieve a correct focusing despite of displacements of the film due to curling and curvature the film or differences in thicknesses of the films.

Figure 4:
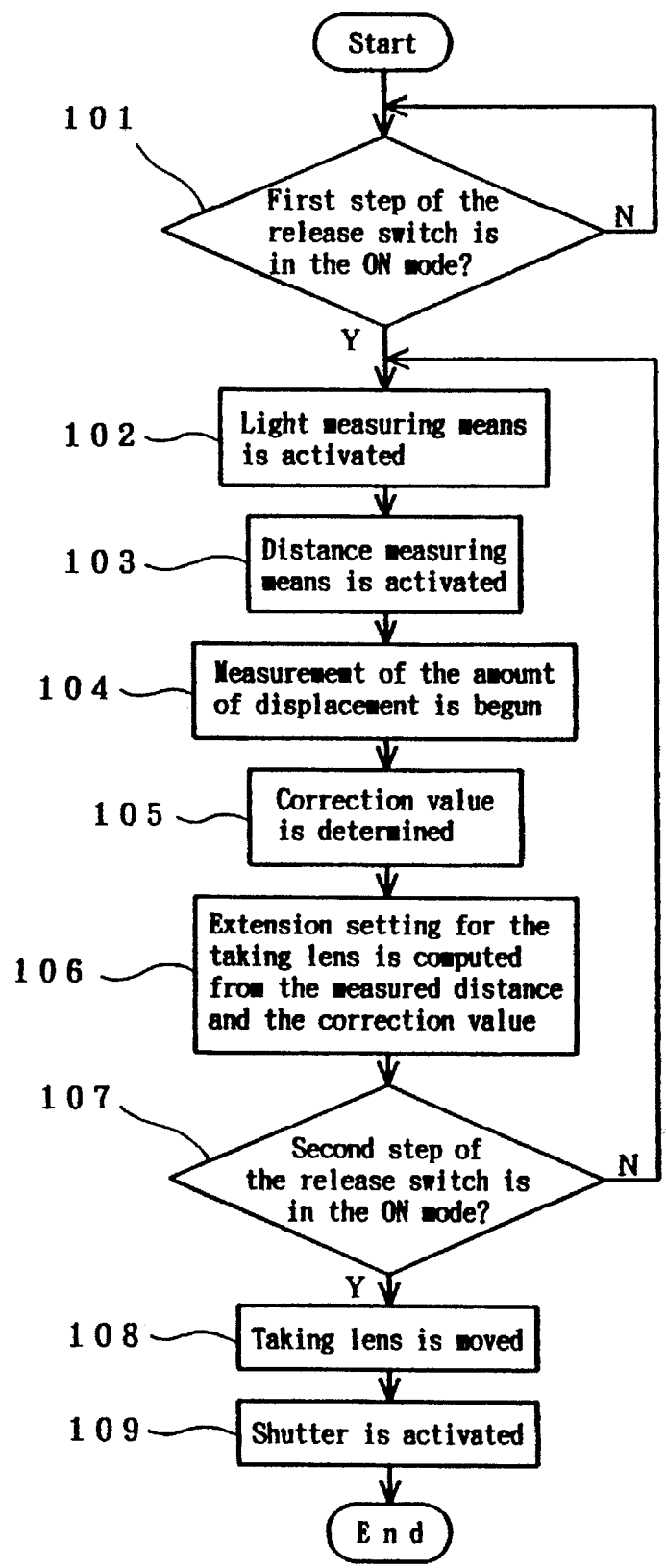
FIG. 4 illustrates a flow chart of the operations of the camera shown in FIG. 1 at the time of photographing an object.

FIG. 4 shows a flow chart which illustrates the operations of the camera shown in FIG. 1 at the time of photographing an object. This flow chart will now be explained below.

First, once the main switch is turned on, the release switch 26 is checked to determine whether or not the first step is in the ON mode (Step 101).

When it is determined at Step 101 that the first step of the release switch 26 is in the ON mode, the light measuring mechanism 22 is activated to measure the brightness of the object being photographed (Step 102), and then a proper exposure level is computed based on such measured brightness.

Furthermore, the distance measuring mechanism 23 is activated (Step 103) to measure the distance from the camera 1 to the object being measured.

Next, measurement of the amount of displacement of the film 12 is begun using the position detecting mechanism 2 of the focal point correction apparatus (Step 104). Namely, the light projecting unit 3 of the position detecting mechanism 2 emits a beam of infrared light.

Then, by determining the position where the reflected light strikes the light receiving element 41 of the position detection mechanism 2, the amount of displacement of the film 12 is computed using the table stored in the memory 24 and the information concerning the determined position (Step 105). Namely, a correction value is computed for the position of the taking lens 50.

Next, an initial extension setting of the object lens 50 for focusing light at the base focal surface 13 is computed based on the data obtained from the distance measuring mechanism 23, and then a final extension setting for the taking lens 50 is computed from the correction value computed at Step 105 and the computed initial extension setting of the taking lens 50 (Step 106).

Next, the release switch 26 is checked to determine whether or not the second step is in the ON mode (Step 107).

When it is determined at Step 107 that the second step of the release switch 26 is in the OFF mode, the program returns to Step 102, and Steps 102–107 are carried out again.

Then, when it is determined at Step 107 that the second step of the release switch 26 is In the ON mode, the taking lens 50 together with the lens barrel 8 are moved to position the taking lens 50 at the final extension setting determined from Step 106 (Step 108). This enables focusing to be carried out at the light-sensitive surface of the central part of the film 12.

Finally, the shutter driving mechanism 25 is activated to operate the shutter 6 to take a photograph (Step 109). At this point, the program is completed.

In the embodiment described above, an automatic focusing mechanism is used to correct the extension setting of the taking lens 50 based on information obtained from the position detecting mechanism 2. However, the focal point correction apparatus according to the present invention is not limited to this structure and may employ other mechanism for carrying out focal point correction of the taking lens 50 based on information obtained from the position detecting mechanism 2.

For example, an electromotive type or hand-operated manual type of focusing mechanism could be used in place of the automatic focusing mechanism. When using a manual type of focusing mechanism, various mechanism of correcting the focal point based on the information obtained from the position detecting mechanism are possible, such as a set-up that allows the mount in which the taking lens 50 is provided to be moved in a step-wise manner In the direction of the optical axis 51, a set-up that allows the position of the abutting portions 161 and 163 to be changed in the direction of the optical axis 51 to allow the film 12 to be moved in the direction of the optical axis 51, and a set-up comprising a correction lens that is placed in the optical path to move the focal point.

Furthermore, in the embodiment described above, the position detecting mechanism 2 comprises a light projecting unit 3, including a light source 31 and a light projecting lens 33, and a light receiving unit 4, including a light receiving element 41 and a light gathering lens 43. However, the position detecting mechanism 2 of the focal point correction apparatus according to the present invention is not limited to this structure and may employ other mechanism for detecting the position of the light-sensitive surface of the film in the direction of the optical axis.

For example, the position detecting mechanism may comprise an ultrasonic transmitter which emits an ultrasonic wave toward the film and a receiver which receives the reflected ultrasonic wave, in which differences in phase in the reflected ultrasonic wave are used to calculate the position of the light-sensitive surface of the film in the direction of the optical axis.

Moreover, even though the position detecting mechanism 2 of the present embodiment was described as carrying out a measurement of the position of the light-sensitive surface of the film 12 at one point thereof, it is not limited to such one point measurement. Instead, the position detecting mechanism 2 may be used to measure the position of the light-sensitive surface of the film 12 at a plurality of points thereof (multiple point measurement). When this is done, the correction value for correcting the focal point may be calculated based on an average taken for all the points measured or based on the data of one or more points measured, resulting in a more reliable measurement of the displacement of the light-sensitive surface of the film 12.

Among these alternatives, the former position detecting mechanism which employs the ultrasonic waves is advantageous since a more precise and reliable correction can be achieved. Further, if this method employing the ultrasonic waves is combined with the multiple point distance measurement described above, it is possible to further improve the focusing of images onto the film 12. On the other hand, in the latter position detecting mechanism, if it is further provided with a measurement point selecting mechanism which selects a desired measurement point among a plurality of positions presented by the multiple point measurement, it becomes possible to obtain an accurate correction value for focusing on the desired measurement point.

Furthermore, in the present embodiment, the point of measurement at the time of detecting the position of the light-sensitive surface of the film 12 with the position detecting mechanism 2 corresponds to and overlaps with or is in close proximity with the point of measurement at the time of measuring the distance between the camera 1 and the object being photographed with the distance measuring mechanism 23 on the photographic image plane. However, the present invention need not be limited to this arrangement, and these two points of measurement may be arranged to be at different positions on the photographic image.

Moreover, the present invention is not limited to the method employed in the embodiment described above in which the amount of displacement of the light-sensitive surface of the film 12 was determined each time a photograph is taken. Instead, it is possible, for example, to make a single determination of the amount of displacement of the film before any photographs are taken by measuring the amount of displacement of the leading strip of film (i.e., the beginning portion of the film that is used only for winding the film) after the film has been loaded in the camera and then using this displacement value to calculate a focal point correction value which will be used for all the photographs taken with the roll of film. In this case, it is possible for the light source 31 of the position detecting mechanism 2 to emit any wavelength of light, even if the film is sensitive to that particular wavelength.

Furthermore, in the memory 24 of the present embodiment, there a table is stored which is composed of a combination of the positions on the light receiving element 41 where reflected light will strike depending on the extent of displacement of the film 12 and the corresponding correction values for correcting the extension setting of the taking lens 50, thereby determining a specific correction value based on the information obtained from the table and the measurement value provided by the position detecting mechanism 2.

However, in the present invention, the determination of a correction value is by no mechanism limited to the method employing this table. Instead, it is possible to store a table in the memory 24 which includes formulas or the coefficients of formulas that show the relationship between the positions on the light receiving element 41 where reflected light will strike and the extension setting of the taking lens 50 in response to each position. In this case, the correction value is calculated on the basis of the formulas or the coefficients of formulas and the measurement value provided by the position detecting mechanism 2.

Moreover, while the focal point correction apparatus of the present embodiment was described for use in a camera 1 that uses photographic film, the present invention is by no mechanism limited to use in such cameras. Instead, the focal point correction apparatus according to the present invention may also be employed, for example, in cameras using Polaroid type photographic paper or photographic printing paper.

Furthermore, it should be noted that the focal point correcting apparatus according to the present invention may be employed in any kind of camera which makes photographic images on light-sensitive materials, such as SLR cameras, compact cameras, Polaroid cameras etc.

Lastly, it should be understood that the above-described embodiment was only one example of many possible structures of the focal point correction apparatus according to the present invention.

Further, it should be also understood that the present disclosure relates to subject matter contained in Japanese Utility Model Application No. 05-64735 filed on Nov. 9, 1993 which is expressly incorporated herein by reference in its entirety.

What is claimed is:

1. A focal point correction apparatus for use in a camera, comprising:

an optical system having a taking lens and an axis for focusing images onto a film;

mechanism for detecting a surface displacement of the film relative to a predetermined base focal position, said predetermined base focal position being a position where light from an object to be photographed is focussed through said taking lens and where the film is normally positioned and for outputting data corresponding to the detected surface displacement; and means for correcting a focal point of said optical system in response to said data outputted by said detecting means.

2. The focal point correction apparatus of claim 1, wherein the focal point of said optical system is corrected by correcting an extension setting of the taking lens based on the data outputted from said detecting means.

3. The focal point correction apparatus of claim 2, wherein said detecting means comprises a light projection unit which emits a beam of light towards the surface of the film, and a light receiving unit that receives said beam of light reflected from said surface of said light-sensitive material.

4. The focal point correction apparatus of claim 3, wherein the light receiving unit has a light receiving element to which the beam of reflected light is received at different positions corresponding to different positions on the film at which the emitted beam is reflected.

5. The focal point correction apparatus of claim 4, further comprising a memory in which a table is stored that lists focal point correction values corresponding to the position of the film in the direction of said optical axis.

6. The focal point correction apparatus of claim 5, further comprising a control unit that corrects the focal point of the taking lens by correcting the extension setting of said taking lens using the data obtained from the detecting means and the table stored in the memory.

7. The focal point correction apparatus of claim 6, wherein the beam of the light projected by the light projecting unit has a wavelength that is substantially outside a wavelength sensitivity of the film.

8. The focal point correction apparatus of claim 2, wherein said extension setting of said taking lens is corrected using an automatic focusing mechanism.

9. The focal point correction apparatus of claim 8, wherein said detecting means measures a position of the surface of the film at a point corresponding to a distance measurement point on a photographic image in the automatic focusing mechanism.

10. A focal point correction apparatus of claim 2, wherein the measurement of the position of the surface of the film is made at a plurality of different positions on the film.

11. The focal point correction apparatus of claim 1, the camera forming an image on a photosensitive material comprising the film.

12. The focus point correction apparatus of claim 1, wherein said detecting means projects a beam of the light having a wavelength that is substantially outside a wavelength sensitivity of the film.

13. A camera, comprising:

an objective optical system for producing an image of an object to be photographed onto light-sensitive material, said objective optical system having an optical axis;

distance measuring means for measuring a distance between the object and said camera;

means for measuring an amount of displacement of a surface of said light-sensitive material with respect to a predetermined base focal plane along the optical axis of said objective optical system;

means for calculating a driving value of said objective optical system for focusing the object image at said predetermined base focal plane;

means for calculating a correction value based on said amount of displacement;

means for adjusting said driving value using said correction value to obtain a final driving value; and means for driving said objective optical system based on said final driving value.

14. The camera of claim 13, wherein said means for measuring projects a beam of the light having a wavelength that is substantially outside a wavelength sensitivity of said light-sensitive material.

15. A method for correcting a focal point on a light-sensitive material in a camera having an objective optical lens system for producing an image of an object to be photographed onto the light-sensitive material, said objective optical system having an optical axis, comprising the steps of:

measuring a distance between the object to be photographed and the camera;

measuring an amount of displacement of a surface of the light-sensitive material with respect to a predetermined based focal plane along the optical axis;

calculating a driving value of the objective optical system for focusing the object image at the predetermined base focal plane;

calculating a correction value based on the amount of displacement;

adjusting the driving value using the correction value to obtain a final driving value; and driving the objective optical system based on the final driving value.

* * * * *

UNITED STATES PATENT AND TRADEMARK OFFICE
CERTIFICATE OF CORRECTION

PATENT NO. : 5,550,612
DATED : August 27, 1996
INVENTOR(S) : Akihiro ARAI

It is certified that error appears in the above-indentified patent and that said Letters Patent is hereby corrected as shown below:

At column 11, line 6 (claim 1, line 5), change "mechanism" to ---means---.

Signed and Sealed this

Eleventh Day of March, 1997

Attest:

BRUCE LEHMAN

Attesting Officer

Commissioner of Patents and Trademarks